(No Model.)

J. R. AYERS.
PEANUT PLANTER.

No. 346,976. Patented Aug. 10, 1886.

Witnesses:

Inventor.
J. R. Ayers

UNITED STATES PATENT OFFICE.

JAMES R. AYERS, OF PETERSBURG, VIRGINIA.

PEANUT-PLANTER.

SPECIFICATION forming part of Letters Patent No. 346,976, dated August 10, 1886.

Application filed March 5, 1886. Serial No. 194,178. (No model.)

*To all whom it may concern:*

Be it known that I, JAMES R. AYERS, of Petersburg, county of Dinwiddie, and State of Virginia, have invented certain new and useful Improvements in Peanut-Planters, of which the following is a specification, reference being had to the accompanying drawings.

Figure 1:
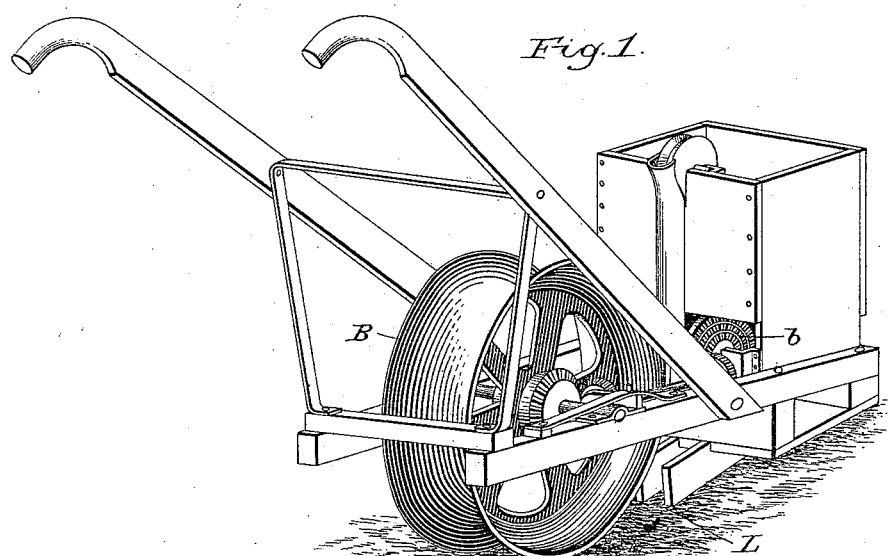
Figure 2:
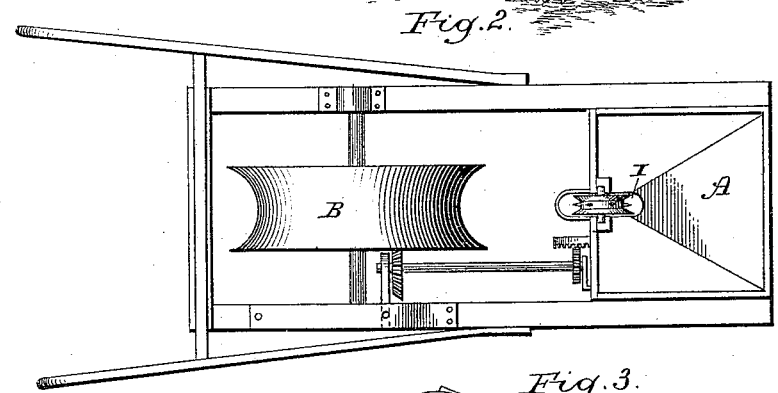
Figure 4:
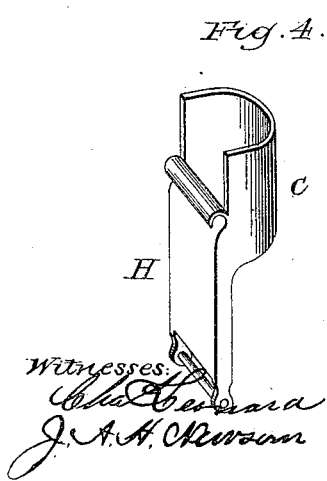
Figure 3:
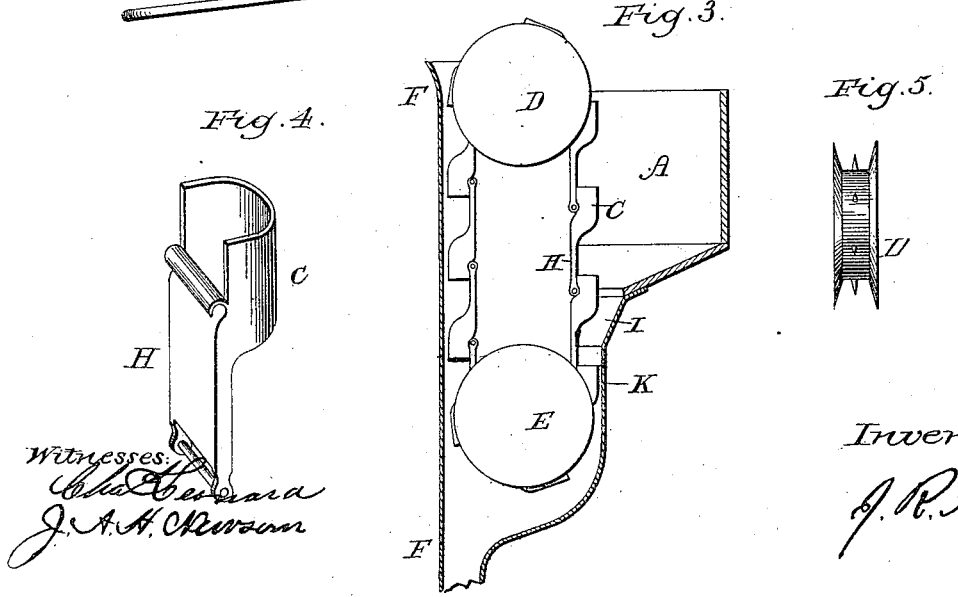
Figure 5:
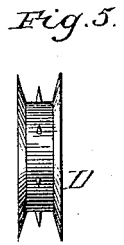

Figure 1 represents a perspective view of the machine embodying my invention; Fig. 2, a top view of the same; Fig. 3, a vertical section of the hopper, showing the dropping device; Fig. 4, a view of a detached link of the chain H, showing the cup or scoop C attached to same at its rear end; Fig. 5, a detail view of the wheels about which the chain shown in Fig. 3 revolves.

The hopper A, at its lowest part more or less encircling the cups, is provided with a funnel, I, and this funnel is prolonged by the tube or trough K, which conforms in size and shape to the cups C, and is of sufficient length to prevent any of the contents of the hopper which may enter the tube from escaping at its lower end before being caught by the cup below.

The operation of the machine is as follows: As the machine advances, motion is communicated to the mechanism by the driving-wheel B, which, by means of the suitable gear-connections, communicates an upward movement to the cups C as they pass through the hopper A. The peanuts deposited in the hopper A, descending by the funnel I and tube K, assume generally a longitudinal position and are more readily taken up by the cups C. When the cups C traverse the wheel D, being attached to the belt or chain at their rear end, they separate more or less from the chain or belt, thus facilitating the discharge of their contents. The peanuts when discharged from the cups cannot escape laterally, owing to the flanges of the wheel D, and are retained by the rear of the cup in advance until they enter the tube F, which, conforming to the cups in shape and size, prevents their escape from the rear of the cups until the cups traverse the wheel E, when they are discharged near the ground and at regular intervals in the rear of the opener L, and are covered by the wheel B.

Having thus described my invention, what I claim as new, and wish to secure by Letters Patent, is—

1. In a planter, the cup or scoop attached to a chain or belt at or near the rear end of cup or scoop, and open on its inner side, so that in working round the wheels the forward part of cup or scoop becomes separated from the chain or belt, thereby facilitating the discharge of its contents.

2. In a planter, the combination of a tube or guard and descending cups or scoops, so that the contents when discharged above are retained by the rear of the cup in advance until the bottom of end of tube or guard is reached, or until the cups describe a curve, thus insuring their final discharge near the ground, accurate and at regular intervals.

J. R. AYERS.

Witnesses:
ROBERT H. CHEW, Jr.,
J. E. LePRADE.